(12) United States Patent
Dickson et al.

(10) Patent No.: US 10,171,281 B2
(45) Date of Patent: Jan. 1, 2019

(54) 4-LEVEL PULSE AMPLITUDE MODULATION TRANSMITTER ARCHITECTURES UTILIZING QUADRATURE CLOCK PHASES

(71) Applicant: INTERNATIONAL BUSINESS MACHINES CORPORATION, Armonk, NY (US)

(72) Inventors: Timothy O. Dickson, Danbury, CT (US); Bongjin Kim, Falcon Heights, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/667,251

(22) Filed: Aug. 2, 2017

(65) Prior Publication Data

US 2017/0359211 A1 Dec. 14, 2017

Related U.S. Application Data

(63) Continuation of application No. 15/479,423, filed on Apr. 5, 2017, now Pat. No. 9,876,667, which is a (Continued)

(51) Int. Cl.
*H04L 27/36* (2006.01)
*H04L 25/03* (2006.01)
*H04L 27/01* (2006.01)

(52) U.S. Cl.
CPC ...... *H04L 27/364* (2013.01); *H04L 25/03878* (2013.01); *H04L 27/01* (2013.01)

(58) Field of Classification Search
USPC .......................................................... 375/298
See application file for complete search history.

(56) References Cited

U.S. PATENT DOCUMENTS 6,680,681 B1 * 1/2004 Hsu ..................... H03M 1/661
341/120
7,308,058 B2 12/2007 Zerbe et al.
(Continued)

OTHER PUBLICATIONS

Min et al., A 20Gb/s Triple-Mode (PAM-2, PAM-4, and Duobinary) Transmitter, Mar. 2012, hereinafter "Min".*
(Continued)

*Primary Examiner* — Wednel Cadeau
(74) *Attorney, Agent, or Firm* — Tutunjian & Bitetto, P.C.; Vazken Alexanian (57) ABSTRACT

A four-level pulse amplitude modulation transmitter and corresponding method are provided. The transmitter includes a most significant bit processing section and a least significant bit processing section. The transmitter further includes at least one termination resistor connected to respective outputs of the processing sections to provide a transmitter output. Each of the processing sections include a set of retiming latches arranged in a parallel for aligning input parallel data and providing parallel aligned latched outputs responsive to one phase of a quarter-rate four-phase quadrature clock. Each of the processing sections further includes a serializer for serializing the parallel aligned latched outputs to provide a serialized output using quarter-rates of the quarter-rate four-phase quadrature clock. Each of the processing sections also include an output driver for driving the serialized output.

20 Claims, 10 Drawing Sheets

Related U.S. Application Data continuation of application No. 14/320,736, filed on Jul. 1, 2014, now Pat. No. 9,674,025.

(56) References Cited

U.S. PATENT DOCUMENTS

| | | | |
|---|---|---|---|
| 7,715,474 B2 | 5/2010 | Park et al. | |
| 8,126,045 B2 | 2/2012 | Bulzacchelli et al. | |
| 8,520,724 B2 | 8/2013 | Kossel et al. | |
| 2007/0177663 A1* | 8/2007 | Buckwalter | H03K 5/135 375/229 |
| 2008/0187036 A1* | 8/2008 | Park | H04L 25/03146 375/233 |
| 2009/0279597 A1 | 11/2009 | Bereza et al. | |

OTHER PUBLICATIONS

List of IBM Patents or Patent Applications Treated as Related dated Aug. 2, 2017, 2 pages.

Kossel, M., et al. "A 10 Gb/s 8-Tap 6b 2-PAM/4-PAM Tomlinson-Harashima Precoding Transmitter for Future Memory-Link Applications in 22-nm SOI CMOS" IEEE Journal of Solid-State Circuits, vol. 48, No. 12, Dec. 2013, pp. 1-17.

Min et al. A 20 Gb/s triple-mode (PAM-2, PAM-4, and duobinary) transmitter. Microelectronics Journal, vol. 43, Issue 10, Oct. 2012, pp. 687-696.

\* cited by examiner

4-LEVEL PULSE AMPLITUDE MODULATION TRANSMITTER ARCHITECTURES UTILIZING QUADRATURE CLOCK PHASES

GOVERNMENT RIGHTS

This invention was made with Government support under Contract No.: H98230-12-C-0325 awarded by the National Security Agency. The Government has certain rights in this invention.

BACKGROUND

Technical Field

The present invention relates generally to architectures for serial data link transmitters employing pulse amplitude modulation (PAM) and, in particular, to 4-level pulse amplitude modulation transmitter architectures utilizing quadrature clock phases.

Description of the Related Art

Demands for high-bandwidth data transmission continues to increase for systems such as servers and high-speed routers. Non-return-to-zero (NRZ) modulation has been commonly employed in such data communication links. In NRZ systems, a single bit of information is conveyed in each data symbol transmitted. This has historically been preferred in many electrical links over other modulation schemes such as pulse amplitude modulation. In 4-level pulse amplitude modulation (PAM-4) serial links, two bits of information are conveyed in each data symbol. This results in better spectral efficiency than NRZ data transmission which is advantageous when transmitted over bandwidth linked channels. However, for a given maximum transmit amplitude, this results in a 9.5-dB reduction in the transmitted signal-to-noise ratio (SNR) as compared to NRZ data. A modern serial link may employ feed-forward equalization (FFE), decision feedback equalization (DFE), continuous-time linear equalization, or any combination of these three equalization techniques. These equalization techniques remove inter-symbol interference (ISI) from data transmitted over bandwidth limited channels, making it easier for the receiver to detect the transmitted bit. This is particularly true if the transmitted data symbol has a high inherent SNR, favoring NRZ signaling over PAM signaling.

Despite its SNR advantage, the increased symbol rate is still a drawback for NRZ signaling as compared to PAM-4. One concern lies in the generation of high-quality, high-frequency clocks for serial transceivers. Random jitter specifications for a Phase Locked Loop (PLL) must be tightened as the symbol rate increases, favoring PAM signaling. To date PAM-4 transmitter architectures have employed a "half-rate" architecture meaning that one symbol is transmitted on every rising and falling edge of a C2 (half-rate) clock. As an example, for 56 Gb/s PAM4 data transmission, the symbol rate is 28 Gbaud, and a half-rate transmitter architecture would require a 14 GHz C2 clock (presumable, two complimentary or differential clock signals). Distribution of these high-frequency clocks may be challenging.

SUMMARY

According to an aspect of the present principles, a four-level pulse amplitude modulation transmitter is provided. The transmitter includes a most significant bit processing section and a least significant bit processing section. The transmitter further includes at least one termination resistor connected to respective outputs of the processing sections to provide a transmitter output. Each of the processing sections include a set of retiming latches arranged in a parallel for aligning input parallel data and providing parallel aligned latched outputs responsive to one phase of a quarter-rate four-phase quadrature clock. Each of the processing sections further includes a serializer for serializing the parallel aligned latched outputs to provide a serialized output using quarter-rates of the quarter-rate four-phase quadrature clock. Each of the processing sections also include an output driver for driving the serialized output.

According to another aspect of the present principles, a method is provided. The method includes providing a four-level pulse amplitude modulation transmitter, wherein said providing step includes. The method further includes providing a most significant bit processing section and a least significant bit processing section. The method also includes providing at least one termination resistor connected to respective outputs of the processing sections to provide a transmitter output. Each of the processing sections is provided to include a set of retiming latches arranged in a parallel for aligning input parallel data and providing parallel aligned latched outputs responsive to one phase of a quarter-rate four-phase quadrature clock. Each of the processing sections is provided to further include a serializer for serializing the parallel aligned latched outputs to provide a serialized output using quarter-rates of the quarter-rate four-phase quadrature clock. Each of the processing sections is provided to also include an output driver for driving the serialized output.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to a quarter-rate 4-level pulse amplitude modulation transmitter architectures utilizing quadrature clock phases. In various embodiments, serialization of both the most significant bit (MSB) and least significant bit (LSB) data in the PAM-4 transmitter is performed using four quadrature clock phases. The serialized data is then fed to the output driver (or pre-driver) for transmission. An alternate embodiment demonstrates a method for including feed forward equalization (FFE) in the PAM-4 transmitter. The present principles avoid the use of half-rate clocks and the high power associated with clocking circuitry at half rate speeds.

Figure 1:
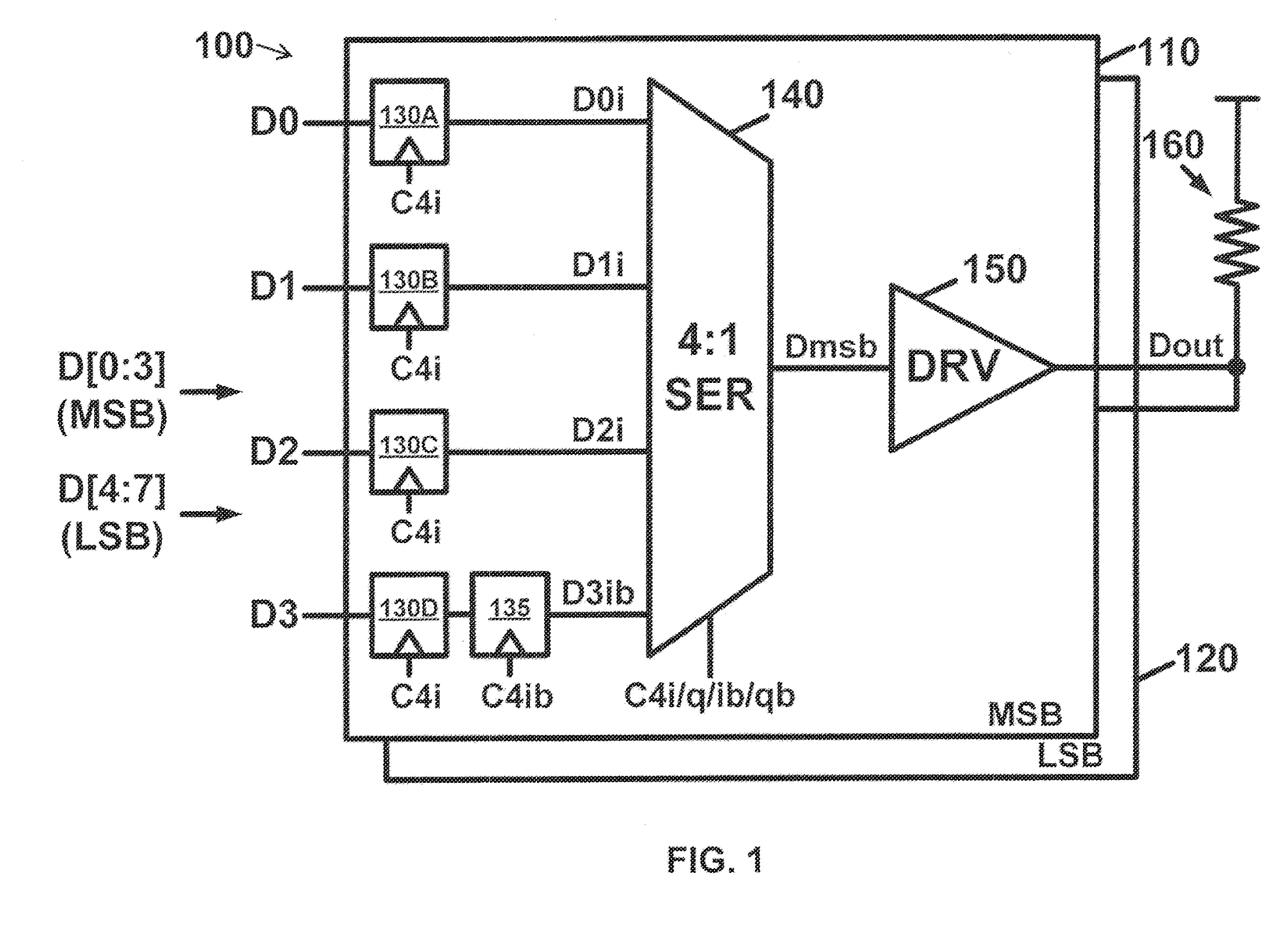
FIG. 1 shows an exemplary quarter-rate 4-level pulse amplitude modulation (PAM-4) transmitter 100, in accordance with a first embodiment of the present principles.

FIG. 1 shows an exemplary quarter-rate 4-level pulse amplitude modulation (PAM-4) transmitter 100, in accordance with a first embodiment of the present principles. For PAM-4 signaling, the transmitter 100 includes two segments, a first segment 110 for transmitting the most significant bit (MSB) (hereinafter also "MSB segment") and a second segment 120 for transmitting the least significant bit (LSB) (hereinafter also "LSB segment"). These two segments 110 and 120 drive an output termination resistor 160 (or, in the case of differential signaling, two output termination resistors). MSB segment 110 receives data bits D[0: 3]. LSB segment 120 receives data bits D[4:7]. For the sake of simplicity, FIG. 1 shows the MSB segment 110. However, it is to be appreciated that the operation and configuration of the LSB segment 120 is the same as that shown for the MSB segment 110, as readily appreciated by one of ordinary skill in the art, given the teachings of the present principles provided herein. The same applies to PAM transmitters 800 and 1000 shown and described with respect to FIGS. 8 and 10.

A segment 110, 120 of the PAM-4 transmitter includes retiming latches 130A-D to align the incoming 4-bit parallel data bits (D0, D1, D2, and D3), a 4:1 serializer 140 using quarter-rates of a quarter-rate 4-phase quadrature clock (C4$i$, C4$q$, C4$ib$, and C4$qb$), and an output driver 150. A pre-driver could be added in between the 4:1 serializer 140 and the output driver 150 depending on the loading considerations. In the embodiment of FIG. 1, the four latches 130A-D are used to align the incoming data using one phase of the quarter-rate clock (depicted as C4$i$, but this could be changed based on timing of the data coming into the segment 110) to output aligned data (D0$i$, D1$i$, D2$i$, and D3$i$). In addition, a fifth latch 135 is placed in series with one of the four data paths to the serializer 140 to improve timing margins, providing data D3$ib$. The purpose of this will be evident from the timing diagram shown in FIG. 2. The data (D0$i$, D1$i$, D2$i$, and D3$ib$) output from latches 130A, 130B, 130C, and 135 is then serialized by the 4:1 serializer 140 using quadrature phases of a quarter-rate (C4) clock to output serialized data Dmsb. Driver 150 outputs Dout to termination resistor 160. In an embodiment, the serialization process performed by 4:1 serializer 140 is illustrated in the timing diagram of FIG. 2.

Figure 2:
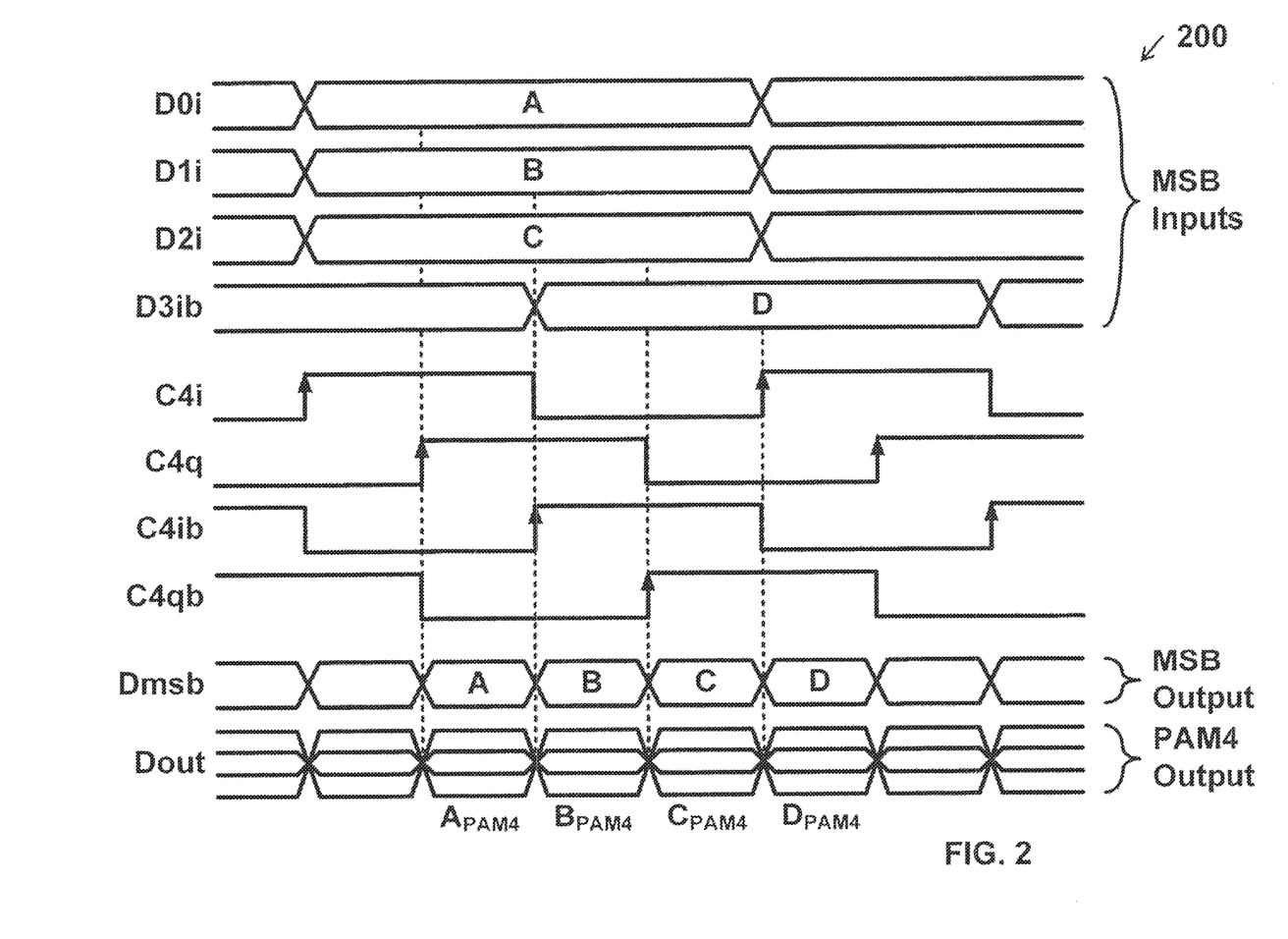
FIG. 2 shows an exemplary timing diagram 200 illustrating the operation of the quarter-rate PAM-4 transmitter 100 of FIG. 1, in accordance with an embodiment of the present principles.

FIG. 2 shows an exemplary timing diagram 200 illustrating the operation of the quarter-rate PAM-4 transmitter 100 of FIG. 1, in accordance with an embodiment of the present principles. For the sake of simplicity, FIG. 2 shows the serialization in the MSB segment. However, it is to be appreciated that the operation of the serializer in the LSB segment 110 is the same as that shown for the MSB segment 120, as readily appreciated by one of ordinary skill in the art, given the teachings of the present principles provided herein.

At any given time, two of the four quadrature clock phases are high. This property is exploited to serialize the data. Data D0 through D3 are retimed on the rising edge of clock phase C4$i$ using latches 130A-D. On the next rising edge of C4$q$ (and noting that C4$i$ is still high), data bit "A" from retimed data D0$i$ is passed through to the output of the serializer. Next, C4$ib$ rises (hence C4$q$ and C4$ib$ are both high) and data bit "B" from retimed data D1$i$ is passed through to the output of the serializer 140. Next, C4$qb$ rises (hence C4$ib$ and C4$q$ are both high) and data bit "C" from retimed data D2$i$ is passed through to the output of the serializer. Finally, on the next rising edge of C4$i$ data from D3 can be serialized. However, note that on this next rising edge of C4$i$, new data is presented to the input of the serializer 140. Hence, an extra latch 135 is needed to hold data D3 for serialization.

The serialized MSB output data bits are combined together with the LSB output data bits and generate the PAM-4 output symbols. It should be noted that we have different timing margins when we latch the 4 parallel inputs using the quarter-rates of the quarter-rate four-phase quadrature clock. The timing margins for C4$q$ and C4$qb$ are both 1-unit interval (UI) of the serialized output while C4$i$ and C4$ib$ have a 2-UI timing margin.

FIGS. 3-7 shows respective exemplary 4:1 serializer implementations 300, 400, 500, 500, and 700 of the serializer 140 shown in FIG. 1, using quadrature C4 clock phases, in accordance with an embodiment of the present principles. To serialize 4 parallel input data using quarter-rates of a quarter-rate four-phase quadrature clock, 4 unit data path segments are placed in parallel and the outputs from those 4 blocks are combined together for 4:1 time-multiplexing and driving the following 3 inverters. Thus, various embodiments for the time multiplexing of the input data are shown in FIGS. 3-7.

Figure 3:
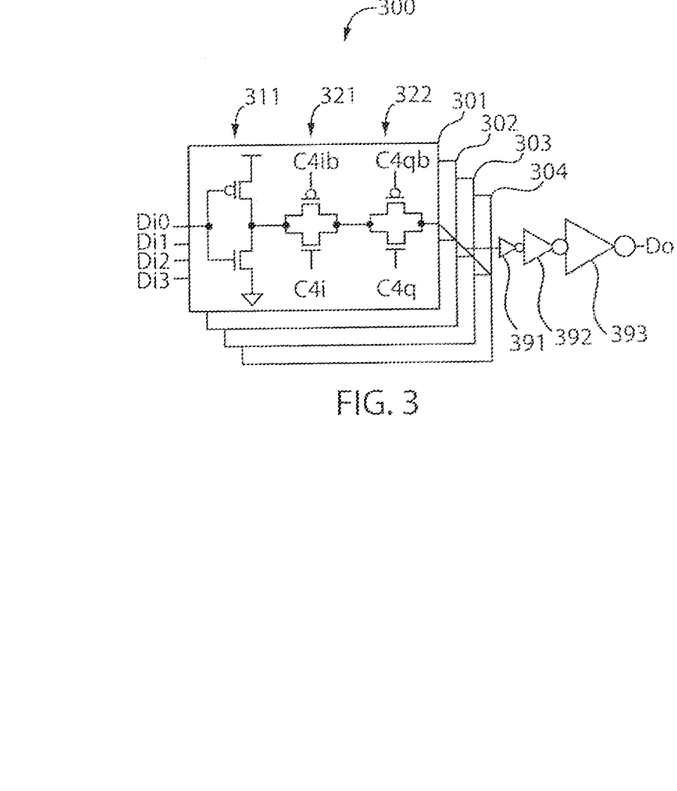
FIGS. 3-7 shows respective exemplary 4:1 serializer implementations 300, 400, 500, 500, and 700 of the serializer 140 shown in FIG. 1, using quadrature C4 clock phases, in accordance with an embodiment of the present principles.

Referring to FIG. 3, for the time multiplexing of the input data, each segment 301, 302, 303 and 304 can be designed using either an inverter 311 with 2 transmission gates 321 and 322 in series, to drive inverters 391, 392, and 393, to make a 25% duty-cycle pulse.

Figure 4:
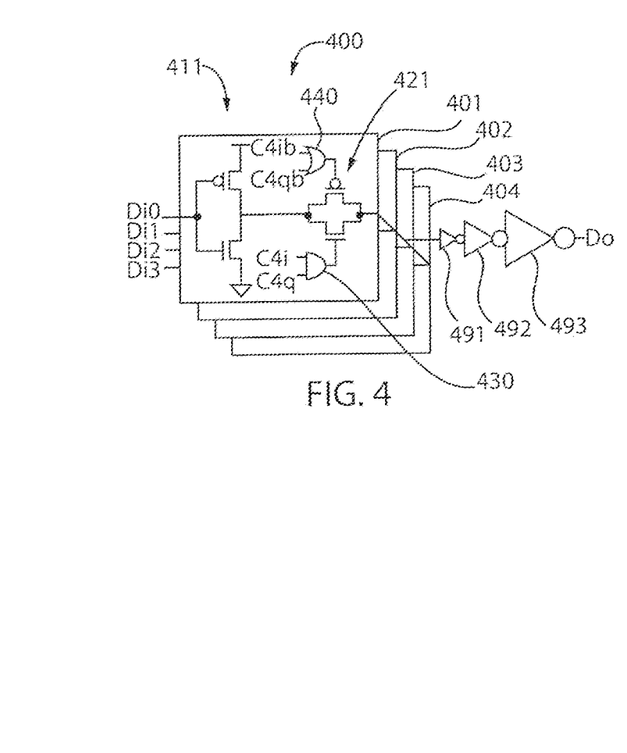

Alternatively, referring to FIG. 4, each segment 401, 402, 403 and 404 can be designed using an inverter 411 with a single transmission gate 421, an AND gate 430, and an OR gate 440, to drive inverters 491, 492, and 493, to make a 25% duty-cycle pulse.

Figure 5:
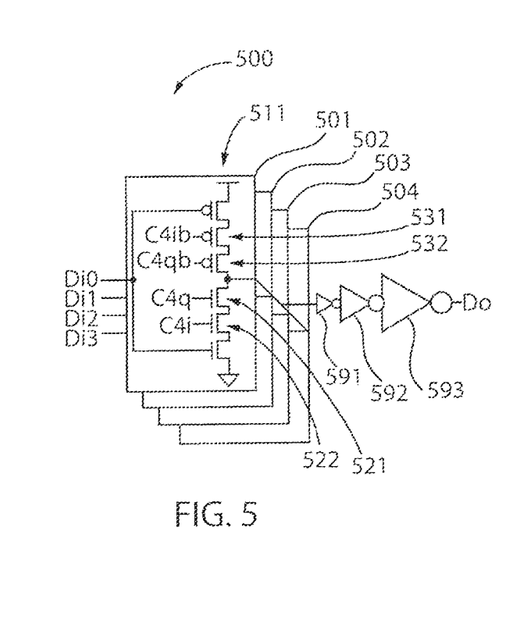

As another alternative, referring to FIG. 5, each segment 501, 502, 503 and 504 can be designed using a tri-state inverter 511 with two NMOS switches 521 and 522 and two PMOS switches 531 and 532, to drive inverters 591, 592, and 593, to make a 25% duty-cycle pulse.

Figure 6:
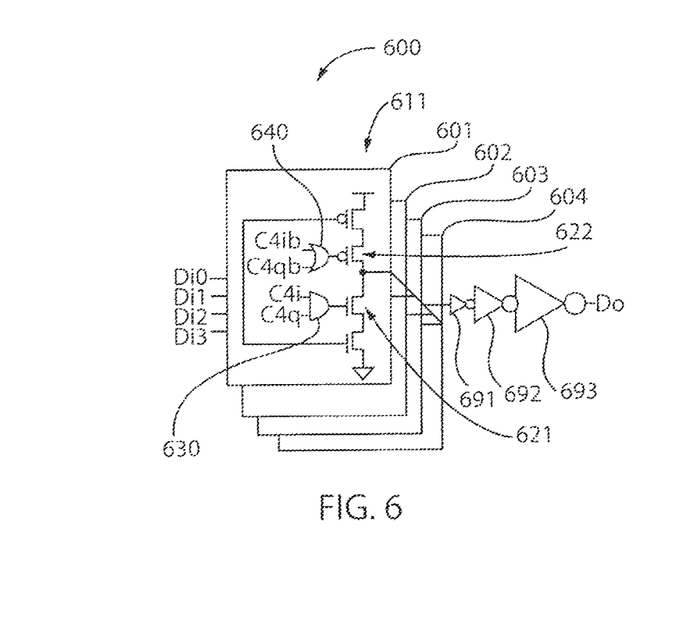

As yet another alternative, referring to FIG. 6, each segment 601, 602, 603 and 604 can be designed using a tri-state inverter 611 with one NMOS switch 621 and one PMOS switch 622, an AND 630, and an OR gate 640, to drive inverters 691, 692, and 693, to make a 25% duty-cycle pulse.

Figure 7:
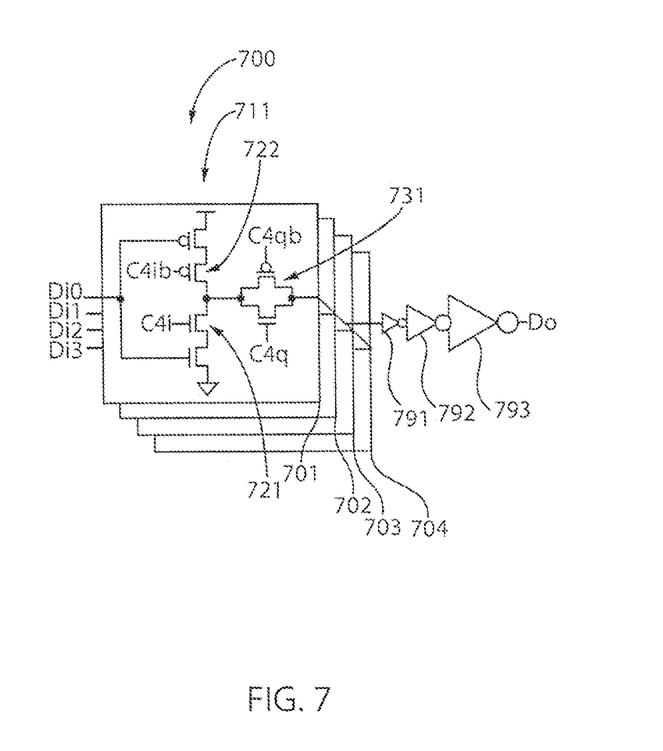

In addition to the 4 different configurations respectively shown in FIGS. 3-6, referring now to FIG. 7, each segment 701, 702, 703 and 704 can be designed using a tri-state inverter 711 with a NMOS switch 721 and a PMOS switch 722, and a single transmission gate 731, to drive inverters 791, 792, and 793, to make a 25% duty-cycle pulse.

Of course, given the teachings of the present principles provided herein, including the configurations 300, 400, 500, 600, and 700 respectively shown in FIGS. 3-7, one of ordinary skill can derive other implementations based thereon, while maintaining the spirit of the present principles. For example, in the examples shown in FIGS. 3-7, various NMOS and PMOS active devices are used. In particular, MOSFETS are used. However, given the teachings of the present principles provided herein, it is to be appreciated that one of ordinary skill in the art can readily implement corresponding serializers with respect to other types of active devices, other channel types, and so forth, while maintaining the spirit of the present principles. These and other variations of the serializers shown in FIGS. 3-7 as well as others derived therefrom are readily determined and implemented by one of ordinary skill in the art given the teachings of the present principles provided herein, while maintaining the spirit of the present principles.

Figure 8:
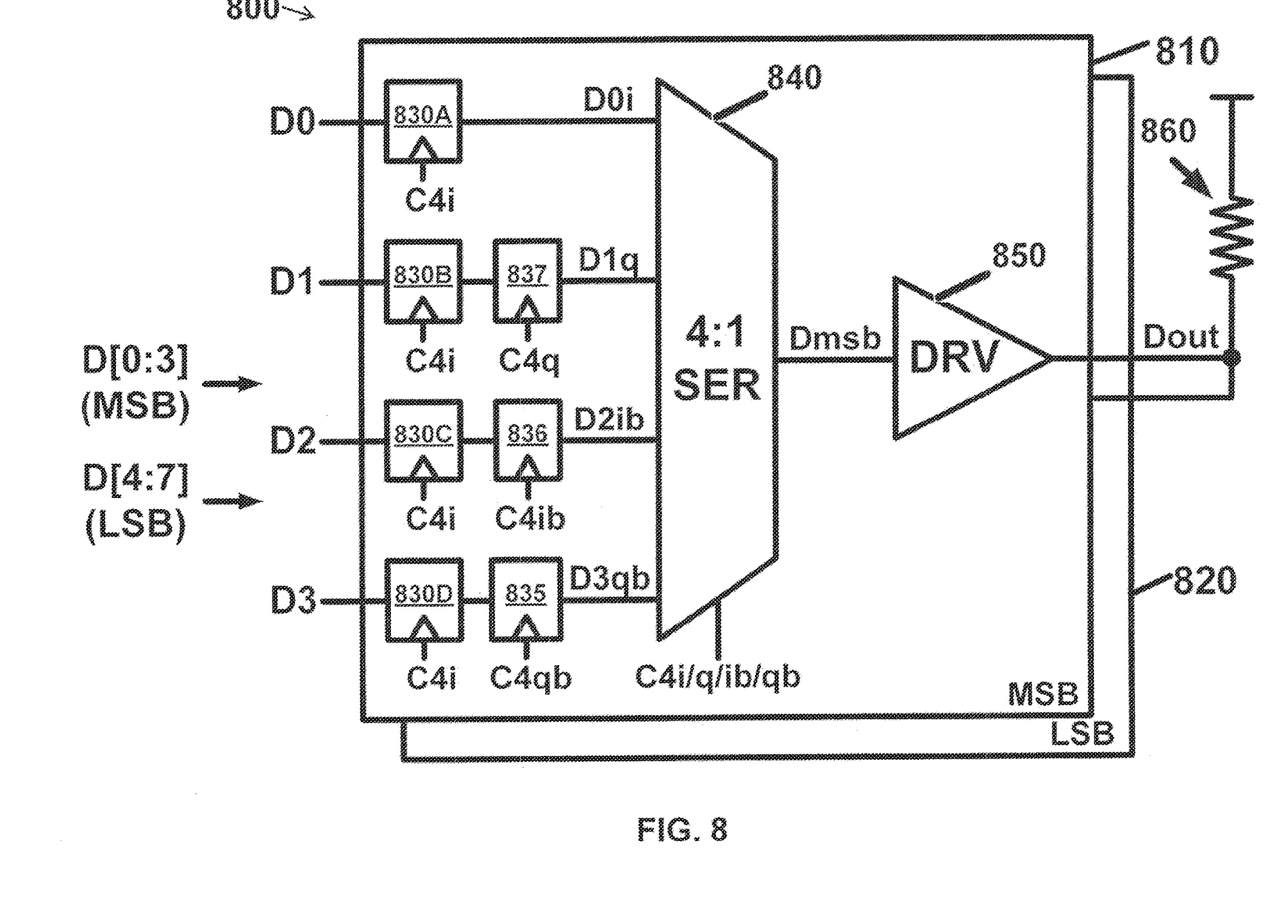
FIG. 8 shows an exemplary PAM-4 transmitter 800, in accordance with a second embodiment of the present principles.

FIG. 8 shows an exemplary PAM-4 transmitter 800, in accordance with a second embodiment of the present principles. To equally distribute the timing margin for all quarter-rates of the quarter-rate 4-phase quadrature clock, 2 latches 836 and 837 are added to transmitter 800 relative to transmitter 100 shown in FIG. 1.

Thus, the elements of FIG. 8 common with FIG. 1 have the same reference numeral, but with the first digit being an 8 for FIG. 8 elements versus a 1 for FIG. 1 elements. These common elements include: MSB section 810; LSB section 820; latches 830A-D; latch 835; 4:1 serializer 840; output driver 850; and termination resistor 860. In addition to these common elements, FIG. 8 further includes the following elements relative to FIG. 1: latch 836; and latch 837. Similar to FIG. 1, latches 830A, 830B, 830C, and 830D output data D0$i$, D1$i$, D2$i$, and D3$i$, respectively. Latches 837, 836, and 835 output data D1$q$, D2$ib$, and D3$qb$, respectively. Serializer 840 receives and serializes data D0$i$, D1$q$, D2$ib$, and D3$qb$, to output serialized data Dmsb. Driver 850 outputs Dout to termination resistor 860.

Figure 9:
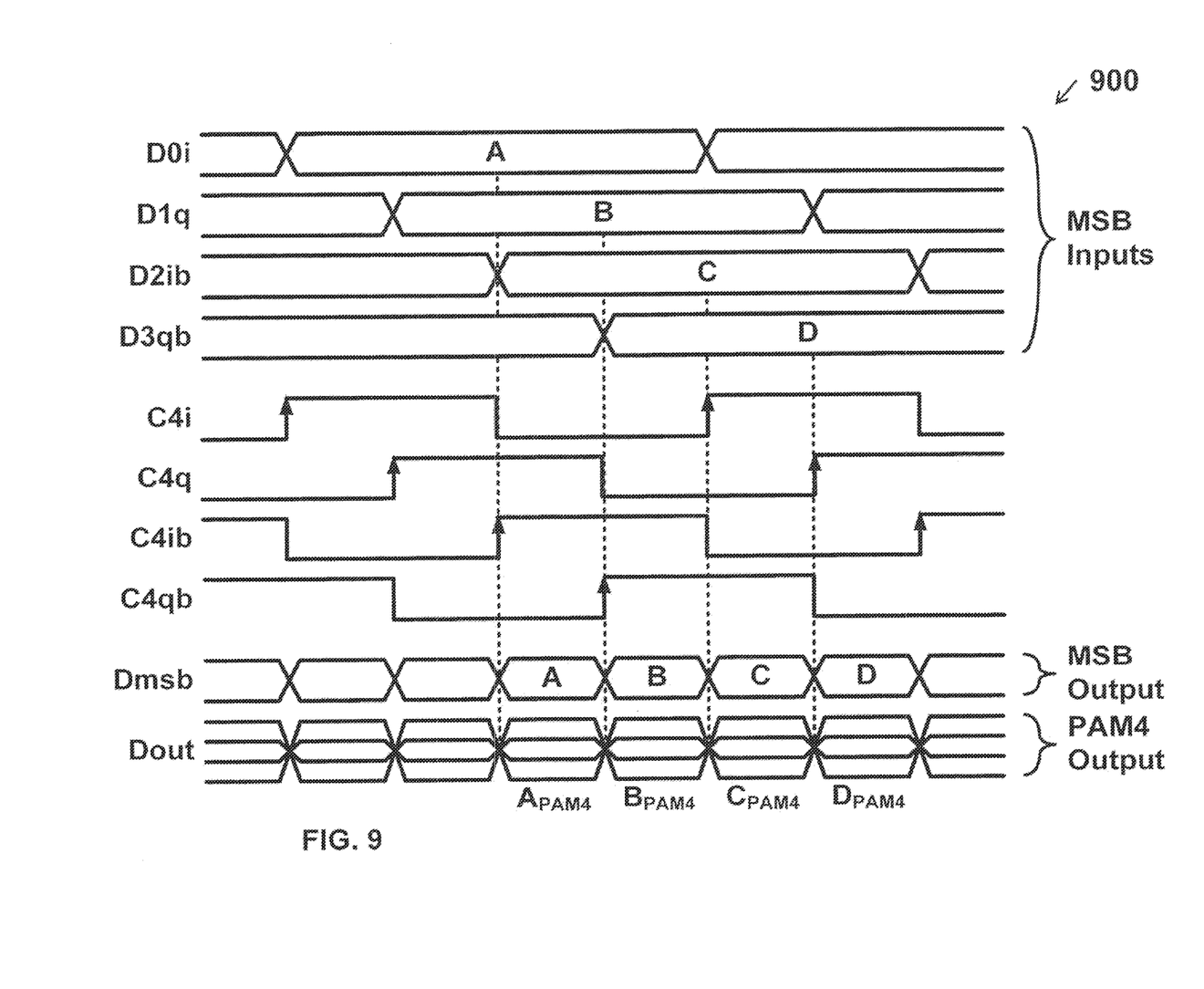
FIG. 9 shows an exemplary timing diagram 900 illustrating the operation of the quarter-rate PAM-4 transmitter 800 of FIG. 8, in accordance with an embodiment of the present principles.

FIG. 9 shows an exemplary timing diagram 900 illustrating the operation of the quarter-rate PAM-4 transmitter 800 of FIG. 8, in accordance with an embodiment of the present principles. After aligning the input data D0 through D3 to the rising edge of C4$i$, data D1, D2, and D3 are further retimed on clock phases C4$q$, C4$ib$, and C4$qb$, respectively. This embodiment exploits the fact that the incoming data has a unit interval (UI) four times greater than the UI of the output data. As can be seen from timing diagram 900, shifting the data using the quadrature clock phases maximizes the serialization timing margins.

Note from timing diagram 900 that when data "B" is serialized, the previous bit "A" and following bit "C" are both still available. Consequently, the embodiment of FIG. 8 could be further modified to include feed-forward equalization (FFE) functionality.

Figure 10:
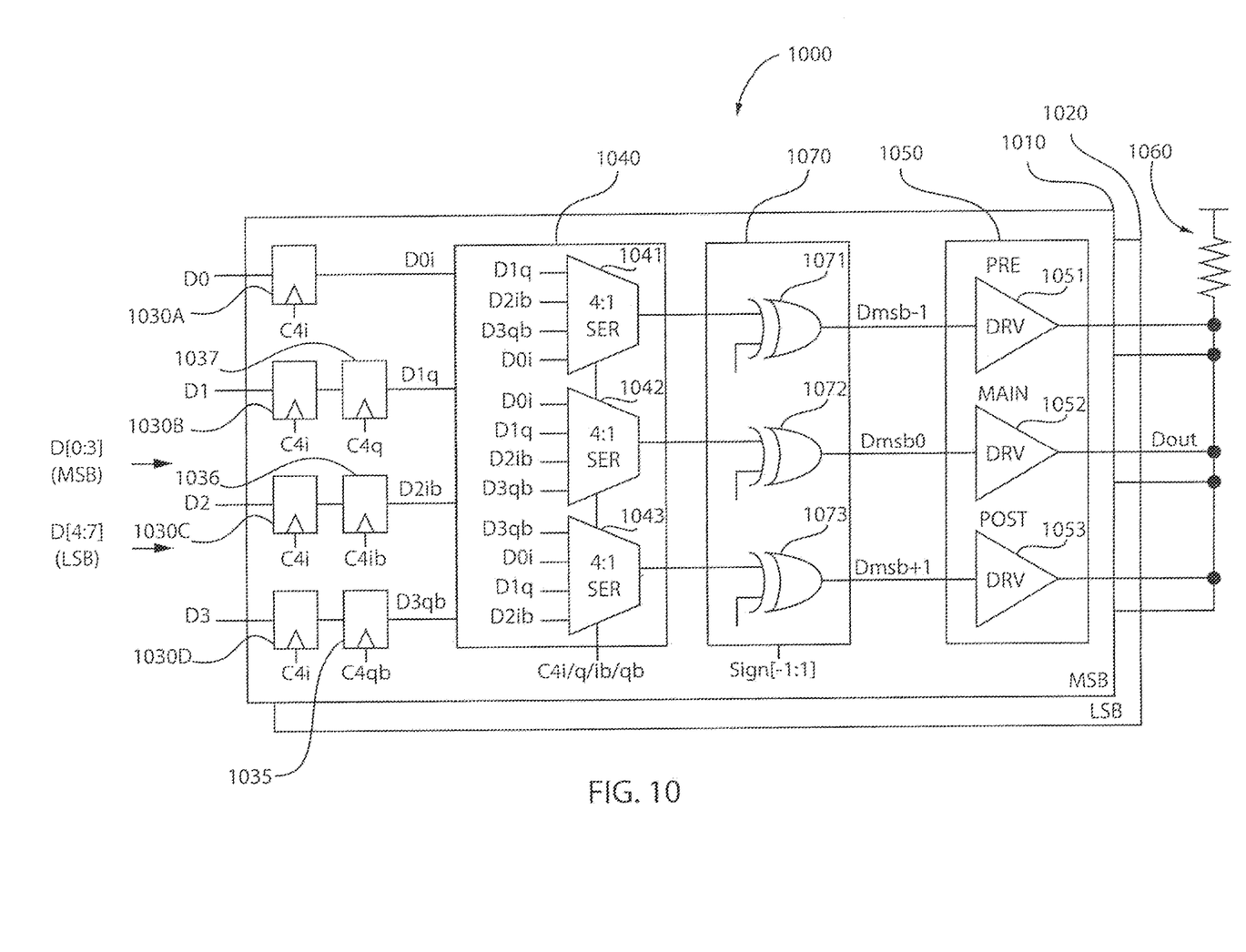
FIG. 10 shows an exemplary PAM-4 transmitter 1000 with 3-tap feed-forward equalization (FFE), in accordance with a third embodiment of the present principles.

FIG. 10 shows an exemplary PAM-4 transmitter 1000 with 3-tap feed-forward equalization (FFE), in accordance with a third embodiment of the present principles.

Three serializers 1041, 1042, and 1043 are required to serialize the pre-and post-cursor data. FFE tap sign selection via FFE tap sign selector 1070 can be implemented by XORing the serialized data with a sign bit using XOR gates 1071, 1072, and 1073 to select signs from [−1:1]. The location of these XOR gates 1071, 1072, and 1073 for tap sign selection could easily be moved before the serializers 1041, 1042, and 1043, or other circuits other than XOR gates could be used to implement sign selection functionality, as would be evident to one of ordinary skill in the art, given the teachings of the present principles provided herein, while maintaining the spirit of the present principles. Moreover, if tap sign programmability is not required, the XOR gates 1071, 1072, and 1073 could be eliminated and fixed tap signs could be implemented. These and other variations of transmitter 1000 are readily contemplated by one of ordinary skill in the art, given the teachings of the present principles provided herein, while maintaining the spirit of the present principles.

The transmitter 1000 further includes a driver circuit 1050 having three drivers 1051, 1052, and 1053 that receive Dmsb−1, Dmsb0, and Dmsb+1. Drivers 1051, 1052, and 1053 respectively correspond to pre-cursor data, main data, and post-cursor data. The outputs of the drivers 1051, 1052, and 1053 are connected to a termination resistor 1060.

Latches 830A, 830B, 830C, and 830D output data D0$i$, D1$i$, D2$i$, and D3$i$, respectively. The transmitter 1000 also includes latches 1037, 1036, and 1035 for equalizing the time margin for all phases of the quarter-rate four-phase quadrature clock. Latches 1037, 1036, and 1035 output data D1$q$, D2$ib$, and D3$qb$, respectively.

Figure 11:
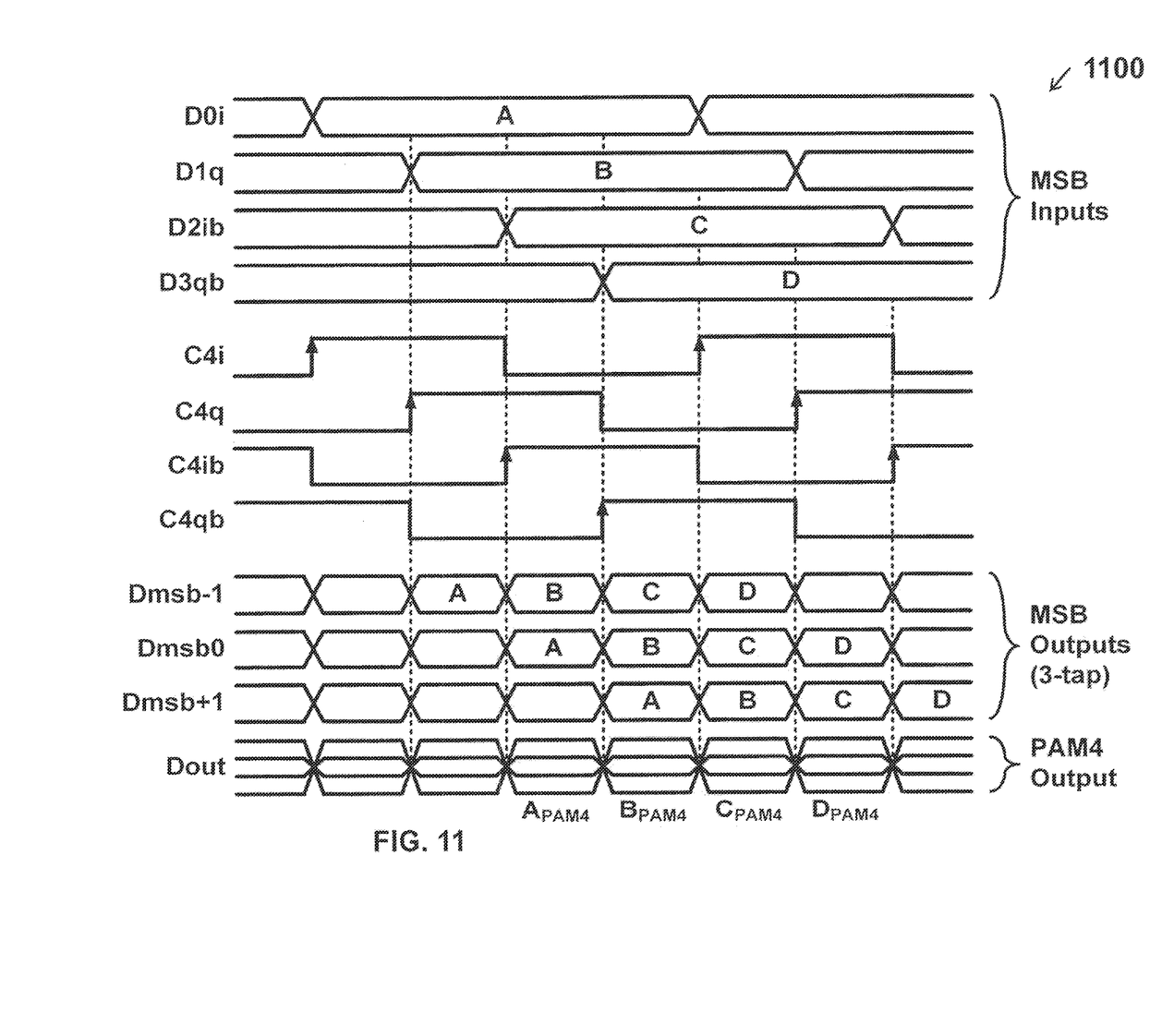
FIG. 11 shows an exemplary timing diagram 1100 illustrating the operation of the quarter-rate PAM-4 transmitter 1000 of FIG. 10, in accordance with an embodiment of the present principles.

FIG. 11 shows an exemplary timing diagram 1100 illustrating the operation of the quarter-rate PAM-4 transmitter 1000 of FIG. 10, in accordance with an embodiment of the present principles.

Figure 12:
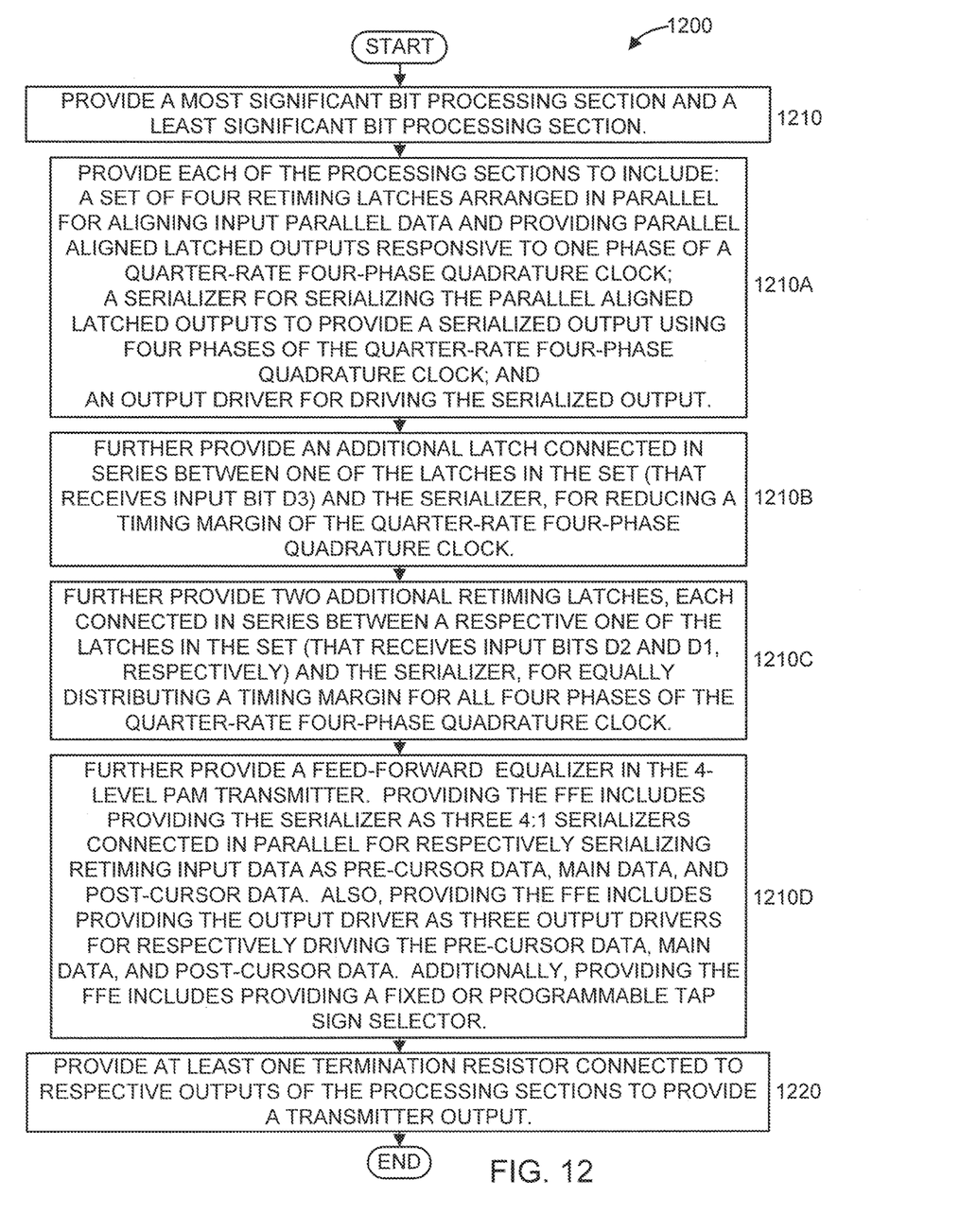
FIG. 12 shows an exemplary method 1200 for providing a quarter-rate 4-level pulse amplitude modulation (PAM-4) transmitter, in accordance with a first embodiment of the present principles.

FIG. 12 shows an exemplary method 1200 for providing a quarter-rate 4-level pulse amplitude modulation (PAM-4) transmitter, in accordance with a first embodiment of the present principles.

At step 1210, provide a most significant bit processing section and a least significant bit processing section.

At step 1220, provide at least one termination resistor connected to respective outputs of the processing sections to provide a transmitter output.

For the 4-level PAM transmitter 100 shown in FIG. 1, step 1210 includes steps 1210A and 1210B. At step 1210, each of the processing sections are provided to include: a set of four retiming latches arranged in a parallel for aligning input parallel data and providing parallel aligned latched outputs responsive to one phase of a quarter-rate four-phase quadrature clock; a serializer for serializing the parallel aligned latched outputs to provide a serialized output using quarter-rates of the quarter-rate four-phase quadrature clock; and an output driver for driving the serialized output. At step 1210B, further provide an additional latch connected in series between one of the latches in the set (that receives input bit D3) and the serializer, for reducing a timing margin of the quarter-rate four-phase quadrature clock.

For the 4-level PAM transmitter 800 shown in FIG. 8, step 1210 further includes step 1210C. At step 1210C, further provide two additional retiming latches, each connected in series between a respective one of the latches in the set (that receives input bits D2 and D1, respectively) and the serializer, for equally distributing a timing margin for all quarter-rates of the quarter-rate four-phase quadrature clock.

For the 4-level PAM transmitter 1000 shown in FIG. 10, step 1210 further includes step 1210D. At step 1210D, further provide a feed-forward equalizer in the four-level pulse amplitude modulation transmitter. The serializer is provided and/or otherwise configured to include three 4:1 serializers connected in parallel for respectively serializing retimed input data as pre-cursor data, main data, and post-cursor data. The output driver is provided and/or otherwise configured to include three output drivers connected in parallel for respectively driving the pre-cursor data, main data, and post-cursor data. A fixed or programmable tap sign selector is provided.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A four-level pulse amplitude modulation transmitter, comprising:
a first processing section including:
a first set of three pairs of retiming latches and a single retiming latch, wherein each pair comprises a first retiming latch and a second retiming latch connected in series between a different one of four parallel data inputs and a first serializer, and the single retiming latch is connected between a remaining one of the four parallel data inputs and the first serializer for equally distributing a timing margin for all quarter-rates of a quarter-rate four-phase quadrature clock, wherein the one phase of the quarter-rate four-phase quadrature clock triggers all of the first retiming latches in each or the three pairs and the single retiming latch, and the remaining three phases of the quarter-rate four-phase quadrature clock triggers a respective one of the second retiming latch in each of the three pairs of retiming latches in sequence.

2. The four-level pulse amplitude modulation transmitter of claim 1, wherein the serializer is a 4:1 serializer.

3. The four-level pulse amplitude modulation transmitter of claim 1, further comprising a second processing section including:
a second set of three pairs of retiming latches and a single retiming latch, wherein each pair comprises a first retiming latch and a second retiming latch connected in series between a different one of four parallel data inputs and a second serializer, and the single retiming latch is connected between a remaining one of the four parallel data inputs and the serializer for equally distributing a timing margin.

4. The four-level pulse amplitude modulation transmitter of claim 2, further comprising a driver having an input connected to the output of the 4:1 serializer.

5. The four-level pulse amplitude modulation transmitter of claim 3, wherein the first processing section is a most significant bit (MSB) processing section and the second processing section is a least significant bit (LSB) processing section.

6. The four-level pulse amplitude modulation transmitter of claim 5, wherein the first serializer and the second serializer are in parallel, and both serializers drive an output termination resistor.

7. The four-level pulse amplitude modulation transmitter of claim 6, wherein serialization of both most significant bit (MSB) data and least significant bit (LSB) data in the PAM-4 transmitter is performed using four quadrature clock phases, wherein the first retiming latch in each pair of retiming latches and the single retiming latch aligns the incoming data using one phase of the quarter-rate clock.

8. The four-level pulse amplitude modulation transmitter of claim 7, wherein the most significant bit (MSB) data is four parallel data bits and the least significant bit (LSB) data is four parallel data bits, and the MSB output data bits are combined together with the LSB output data bits to generate PAM-4 output symbols.

9. The four-level pulse amplitude modulation transmitter of claim 8, wherein the four parallel data bits of the most significant bit (MSB) data are retimed on the rising edge of a clock phase using latches by the first retiming latch in each pair of retiming latches and the single retiming latch.

10. The four-level pulse amplitude modulation transmitter of claim 9, wherein the second retiming latch in each pair retimes three of the four parallel data bits to maximize the serialization timing margins.

11. A four-level pulse amplitude modulation transmitter, comprising:
a first processing section including:
a first set of three pairs of retiming latches and a single retiming latch, wherein each pair comprises a first retiming latch and a second retiming latch connected in series between a different one of four parallel data inputs and a first 4:1 serializer, and the single retiming latch is connected between a remaining one of the four parallel data inputs and the first 4:1 serializer; and
a second processing section including:
a second set of three pairs of retiming latches and a single retiming latch, wherein each pair comprises a first retiming latch and a second retiming latch connected in series between a different one of four parallel data inputs and a second 4:1 serializer, and the single retiming latch is connected between a remaining one of the four parallel data inputs and the 4:1 serializer for equally distributing a timing margin.

12. The four-level pulse amplitude modulation transmitter of claim 11, wherein the four-level pulse amplitude modulation transmitter includes feed-forward equalization (FFE) functionality.

13. The four-level pulse amplitude modulation transmitter of claim 11, further comprising an output termination resistor connected to the first 4:1 serializer and the second 4:1 serializer, wherein the first 4:1 serializer and the second 4:1 serializer are in parallel, and both 4:1 serializers drive the output termination resistor to output PAM-4 output symbols.

14. The four-level pulse amplitude modulation transmitter of claim 11, wherein the first processing section and the second processing section are configured for equally distributing a timing margin for all quarter-rates of a quarter-rate four-phase quadrature clock, wherein the one phase of the quarter-rate four-phase quadrature clock triggers all of the first retiming latches in each or the three pairs and the single retiming latch, and the remaining three phases of the quarter-rate four-phase quadrature clock triggers a respective one of the second retiming latch in each of the three pairs of retiming latches in sequence.

15. A four-level pulse amplitude modulation transmitter, comprising:
a first processing section including:
a first set of three pairs of retiming latches and a single retiming latch, wherein each pair comprises a first retiming latch and a second retiming latch connected in series between a different one of four parallel data inputs and a first serializer, and the single retiming latch is connected between a remaining one of the four parallel data inputs and the first serializer for equally distributing a timing margin for all quarter-rates of a quarter-rate four-phase quadrature clock, wherein the one phase of the quarter-rate four-phase quadrature clock triggers all of the first retiming latches in each or the three pairs and the single retiming latch, and the remaining three phases of the quarter-rate four-phase quadrature clock triggers a respective one of the second retiming latch in each of the three pairs of retiming latches in sequence; and
a second processing section including:
a second set of three pairs of retiming latches and a single retiming latch, wherein each pair comprises a first retiming latch and a second retiming latch connected in series between a different one of four parallel data inputs and a second serializer, and the single retiming latch is connected between a remaining one of the four parallel data inputs and the second serializer for equally distributing a timing margin for all quarter-rates of a quarter-rate four-phase quadrature clock, wherein the one phase of the quarter-rate four-phase quadrature clock triggers all of the first retiming latches in each or the three pairs and the single retiming latch, and the remaining three phases of the quarter-rate four-phase quadrature clock triggers a respective one of the second retiming latch in each of the three pairs of retiming latches in sequence.

16. The four-level pulse amplitude modulation transmitter of claim 15, wherein the first processing section further includes a second serializer and a third serializer configured to serialize pre-cursor data, main data, and post-cursor data.

17. The four-level pulse amplitude modulation transmitter of claim 16, wherein the first processing section further includes a feed-forward equalization (FFE) tap sign selector connected to the first serializer, second serializer, and a third serializer.

18. The four-level pulse amplitude modulation transmitter of claim 17, wherein the feed-forward equalization (FFE) tap sign selector includes three XOR gates.

19. The four-level pulse amplitude modulation transmitter of claim 18, wherein the first processing section further includes a first driver circuit having three drivers connected to the feed-forward equalization (FFE) tap sign selector, wherein each of the three drivers is connected to one of the three XOR gates.

20. The four-level pulse amplitude modulation transmitter of claim 19, further comprising an output termination resistor connected to the first driver circuit, wherein the first driver circuit drives the output termination resistor.

* * * * *